Figures 1, 2, 3:
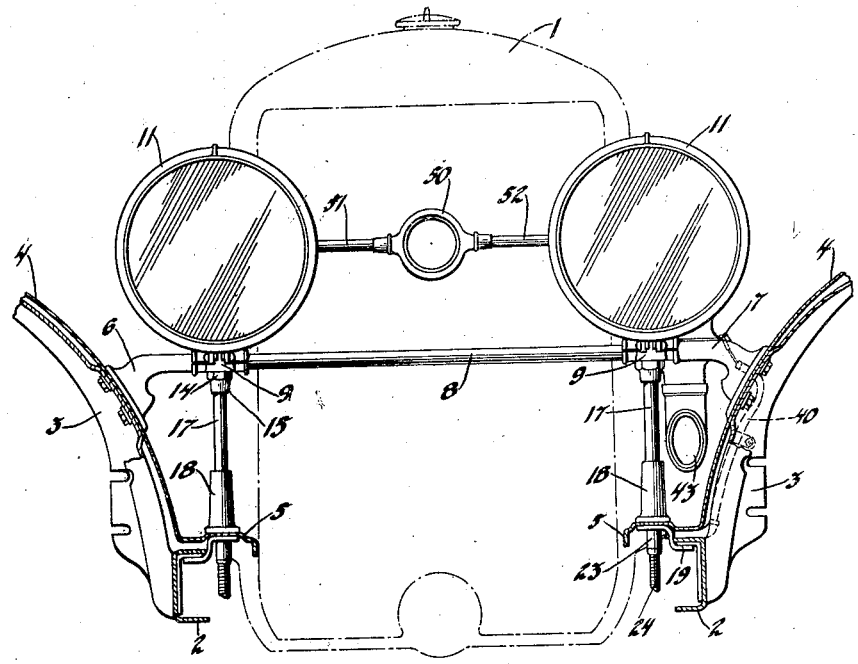

March 10, 1931.  E. W. SEAHOLM  1,795,899
HEADLAMP MOUNTING
Filed Nov. 7, 1928   2 Sheets-Sheet 1

Inventor
Ernest W. Seaholm
By Blackmore, Spencer & Finch
Attorneys

March 10, 1931.    E. W. SEAHOLM    1,795,899
HEADLAMP MOUNTING
Filed Nov. 7, 1928    2 Sheets-Sheet 2
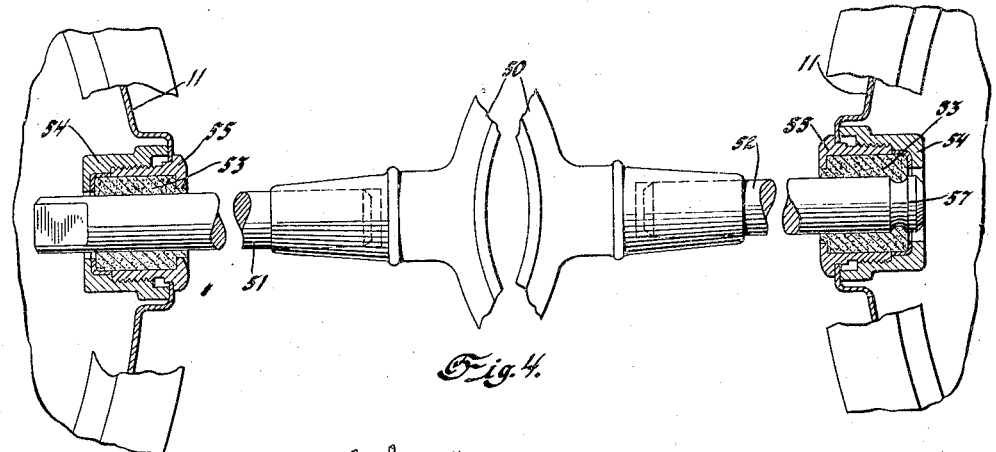
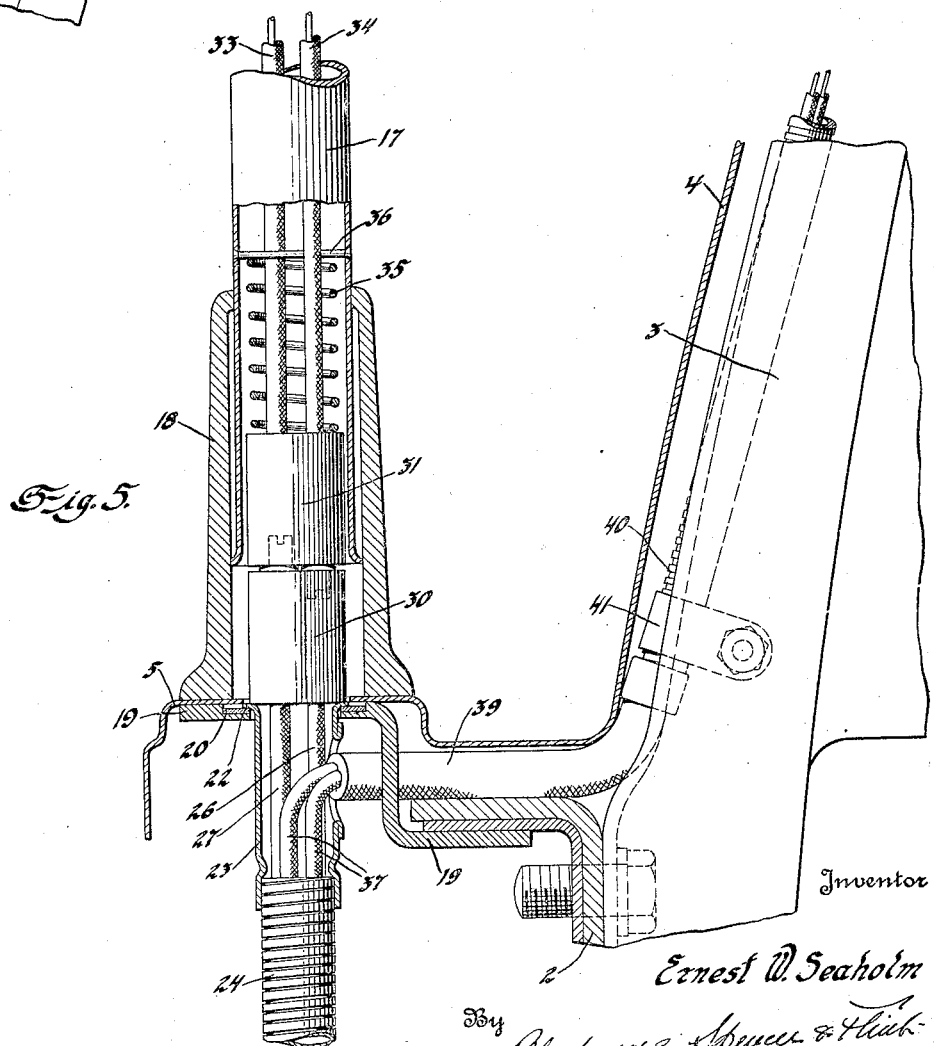
Inventor
Ernest W. Seaholm
By Blackmore, Spencer & Hick
Attorneys Patented Mar. 10, 1931

1,795,899

UNITED STATES PATENT OFFICE

ERNEST W. SEAHOLM, OF BIRMINGHAM, MICHIGAN, ASSIGNOR TO GENERAL MOTORS CORPORATION, OF DETROIT, MICHIGAN, A CORPORATION OF DELAWARE

HEADLAMP MOUNTING

Application filed November 7, 1928. Serial No. 317,725.

This invention relates to motor vehicles and particularly to an improvement in headlamp mountings.

It is an object of the invention to provide a headlamp assembly that will give a distinctive and pleasing appearance as well as one of ruggedness in construction, and lend an ornamental effect to the front end of the vehicle, and which will provide a sturdy brace for the fenders; an adjustable mounting for the lamps; a support for the horn, and concealment for the wires or current conductors leading to the lamps and horn.

A further object of the invention is to provide an assembly wherein an insignia or emblem may be supported on a strut extending between the lamps, and wherein the strut is attached with the respective lamps by a novel connection that will not interfere with relative adjustment of the lamps and which, furthermore, will insulate the parts from each other in a manner to prevent noise and rattle.

Another object of the invention is to provide a construction which includes a resilient mounting for the horn or signal device, which will cushion shocks and strains so as to save the horn mechanism from damage, and to a certain extent cushion and break up the vibrations that would ordinarily be transmitted to associated parts upon horn operation and so reduce the tendency toward induced sympathetic vibrations or resonance in such parts.

Other objects and advantages will become apparent from the following specifications when taken in connection with the accompanying drawing illustrating a preferred but not necessarily the only embodiment of the invention, as it is now incorporated on one of the well known automobiles now on the market.

In the drawing Fig. 1 is a front elevation of the headlamp assembly; Fig. 2 is a side elevation partly in section; Fig. 3 is a fragmentary top plan view partly in section; Fig. 4 is an enlarged detail sectional view showing the mounting for the emblem-carrying strut; Fig. 5 is a detail sectional view of the lower portion of the assembly illustrating how the wires are hidden from view.

Referring by reference characters to the accompanying drawing, the numeral 1 indicates an automobile radiator and 2—2 a pair of longitudinally extending side members of a chassis frame. Extending upwardly and outwardly from each frame member 2 is a bracket 3 for carrying a fender or mudguard 4 located over a front wheel and having a laterally extending portion 5 at its lower end, overlying the top of the chassis frame member 2. Secured as by rivets or bolts to the fender brackets 3, are a pair of lamp brackets 6 and 7, respectively, each having a hollow split head portion into which head portions extend the opposite ends of a bar 8, whereby there is formed a tie-rod or rigid brace between the two fenders. The head of each bracket 6 and 7 has a split lug or forward extension 9 through which projects a short length of tubing 12 having its upper end flanged over as at 13 to secure it within the hollow semi-spherical member 10 riveted to the lamp housing 11, and seated in a concave socket in the upper portion of the split lug 9 for permitting adjustment of the lamp to be made. A nut 14 threaded on the lower end of the tube 12 serves to contract and clamp the split head about the tie-rod 8, and to hold the lamp in the position to which it may be adjusted by reason of the ball and socket connection. The nut 14 is provided with a skirt or extension 15, enclosing the upper end of a vertical post or tube 17, the lower end of the post extending within a tubular base member 18 secured by rivets or bolts to the portion 5 of the fender and the reinforcing bracket 19 bolted to the top flange of the frame member 2. Seated on a washer 20 in the bracket 19 is an outturned flange 22 of a sleeve 23 fitted on the end of the flexible metallic cable or conduit 24 enclosing electric wires leading from suitable switches at the driver's seat.

The wires 26 and 27 respectively are for the bright and dim light circuits and lead to a connector plug 30 seating against the flange 22 and having detachable connection with a plug 31 from which lead the wires 33 and 34, projecting through and concealed within the hollow post 17 and tubing 12 to the interior of the lamp housing. The contact elements of the connector plugs 30 and 31 are maintained in electrical engagement by the tension of a coil spring 35 located within the tube 17 and seated at opposite ends against the pin or rivet 36 and plug 31. The cable 24 also encloses wires 37 that extend laterally through an opening in the sleeve 23, the insulator cover 39 and the flexible metallic cable 40 hidden from view by being secured by clips 41 on the rear side of the fender bracket 3, and thence through an opening in the side of the fender 4, where they are connected by nuts 42 to the connector studs of a horn or similar signal device 43. Extending upwardly through flanged portions of the horn 43 are a pair of bolts 44 which also project through and secure to the flanged portions two sets of laminated spring plates 46 and 47 fastened by rivets 48 on opposite sides of a lug 49 projecting rearwardly from the bracket 7, the spring plates thus forming a resilient mounting for the horn.

Extending between the two lamps and spaced above the tie bar 8 is a strut consisting of a central emblem portion or medallion 50, which may be an insignia of the manufacturer, or the like, and a pair of rods or shafts 51 and 52 riveted or otherwise secured within tubular arms on opposite sides of the medallion. The outer ends of the rods 51 and 52 project through the sides of the respective lamp casings 11 and are surrounded by a bushing or sleeve 53 of elastic deformable material, such as rubber, housed or enclosed within the parts 54 and 55 screw-threaded one into another. The housing parts 54 and 55 are provided with cooperating shoulders which upon the threading together of the parts 54 and 55 clamp therebetween the wall of the lamp housing 11. Such threading together of the parts also places the rubber bushing 53 under pressure so that it hugs tightly around the shaft or rod. The end of the rod 52 is preferably provided with an annular groove or recess 57 into which the material of the bushing 53 is crowded upon compression, so as to effect a tight joint and prevent axial movement of the rod 52. The surface of the end of the rod 51 engaged by the elastic bushing 53 is preferably smooth so that it may be shifted axially to promote ease of assembly as well as to permit a certain amount of limited relative motion upon adjustment of the lamps. The yieldable character of the bushing permits relative adjustments of the two lamps to be readily made without affecting the position of the medallion or imposing any strain upon the connected parts.

In use the fender brace or tie rod is preferably enameled a black or other dark color, and the medallion bar between the lamps and the posts 17 together with the tubular bases 18 are brightly painted or preferably metal plated and highly polished, whereby a pleasing contrast is had and an appearance of great ruggedness is effected and to the casual observer or one who does not closely inspect the assembly, the impression is had of two lamps supported on vertical posts and braced to each other by a horizontal bar.

Various modifications of the above described structure may be readily made as will be apparent to those skilled in the art.

I claim:

1. A mounting for the headlamps of a motor vehicle, including a transversely extending fender brace, a pair of lamps to be supported on said brace, a hollow tubular projection on each lamp adapted to extend through said brace, a nut fastened on said projection to hold the lamp in place and having a skirt portion thereon, a hollow tubular member having its upper end extending into said skirt portion, a tubular base element secured to the vehicle and telescoping the lower end of said tubular member and a current-conducting wire concealed within said hollow tubular parts.

2. A mounting for a headlamp including a support, a hollow projection of the lamp extending through the support, a nut threaded on said projection to secure it to the support, an upwardly extending tubular member having its upper end extending into a skirt on the fastening nut so as to be in alinement with said hollow projection and a current-conducting wire concealed within said tubular member and leading through the hollow projection to the light element of the lamp.

3. In a motor vehicle, the combination with a chassis frame having a pair of fenders on opposite sides thereof, and a transversely extending tie bar connecting the fenders, of a lamp to be mounted on the tie bar having a hollow projection extending through the bar, a fastening nut threaded on said projection to hold it in fixed relation with the bar, an upwardly extending tubular member having its upper end removably enclosed within an extension of the nut and alined with said hollow projection, a housing slidably enclosing the lower end of said tubular member and cooperating with said member and projection to constitute a hollow post, a mounting bracket carried by the chassis frame for fixedly securing said housing, and current-conducting wires leading upwardly through the hollow post to the light element of the lamp.

4. In a motor vehicle, the combination with a chassis frame having a pair of fenders on opposite sides thereof, and a transversely extending tie bar connecting the fenders, of a lamp mounted directly on the tie bar, and an ornamental hollow post extending upwardly from the chassis frame to the lamp without supporting any weight of the lamp and adapted to completely conceal the conductor leading to the lamp.

5. In a mounting for headlamps for motor vehicles, the combination with a chassis frame, supporting means above the chassis frame for a headlamp, and a headlamp mounted directly on said means, of a post independent of the supporting means extending to the lamp from the frame, and a current conducting wire completely concealed within said post.

6. The structure of claim 5 wherein a housing encloses the lower end of the post and a bracket fastened on the frame supports said housing.

7. The structure of claim 5 wherein a pair of detachable connector plugs are associated with the conducting wire at the lower end of the post, and a tension spring enclosed within the post, is active in maintaining the plugs connected.

8. In a motor vehicle, the combination with a chassis frame having a pair of fenders on opposite sides thereof, and a transversely extending tie bar connecting the fenders, a pair of lamps adjustably mounted on said tie bar in spaced relation, a strut extending from one to the other of said lamps, and connections between the lamps and said strut including elastic deformable material whose deformation accommodates relative adjustment of said lamps.

9. In a motor vehicle, the combination with a chassis frame having a pair of fenders on opposite sides thereof, and a transversely extending tie bar connecting the fenders, a pair of lamps adjustably mounted on said tie bar in spaced relation, a strut extending from one to the other of said lamps and a cushioned connection between said strut and one of the lamps.

10. In a mounting for headlamps or the like, the combination with a pair of lamps and means to adjustably mount said lamps, of a strut extending between said lamps, and means to connect the ends of said strut with the lamps, said means including elastic deformable material that is yieldable so as not to interfere with the relative adjustment of said lamps.

11. In a mounting for headlamps or the like, the combination with a pair of lamps and mounting means therefor, of a strut extending from one to the other of said lamps and non-metallic vibration absorbing connections between the lamps and said strut.

12. In a mounting for headlamps or the like, the combination with a pair of lamps and means to adjustably mount said lamps, of a strut extending between said lamps, and cushioned connections between said lamps and strut, said connections each including a deformable bushing surrounding the strut and a housing for the bushing carried by the lamp.

13. In a mounting for headlamps or the like, the combination with a pair of lamps and means to adjustably mount said lamps, of a strut extending between said lamps, and cushioned connections between said lamps and strut, each connection including a bushing of deformable material surrounding an end of the strut and a pair of housing members carried by a lamp and interconnected with each other for adjustment to place said deformable bushing under pressure to crowd the same into close contact with the end of said strut, one end of the strut having a recess therein into which the deformable material is crowded to effect a tight joint.

14. In a motor vehicle, a headlamp, means to fixedly mount the lamp, a current conductor leading to the lamp, and an ornamental hollow post concealing the conductor and comprising a pair of telescopic tubes and spring means associated therewith tending to expand said tubes.

15. In a motor vehicle, a frame, a lamp supported in spaced relation with the frame, a current conductor extending to the interior of the lamp thru an opening, a pair of telescopic tubes enclosing said conductor, one being fixed to the frame and the other being movable in alinement with said opening, and a spring for expanding said tubes, against the resistance of which the tubes may be collapsed to permit inspection of the conductor.

16. In a motor vehicle, a frame, a lamp support spaced above the frame, a lamp mounted on the support, a pair of telescopic tubes carried by the frame and extending from the frame to the support, one of the tubes being fixed to the frame, and the other being movable relative to the fixed tube toward and from the support, and means for holding the tubes distended.

17. In a motor vehicle, a frame, a lamp support spaced above the frame, a lamp mounted on the support, a pair of telescopic tubes carried by the frame and extending from the frame to the support adjacent the lamp, and spring means for yieldingly holding the tubes distended between the frame and support.

18. In a motor vehicle, a frame, a headlamp support spaced above the frame, a lamp mounted on the support, and a vertical post carried by the frame for projection toward the lamp across said space.

19. In a motor vehicle, a frame, a headlamp support spaced above the frame, a lamp having a tubular projection for attachment with the support, and an ornamental post carried by the frame and removably associated with said projection independently of the attachment of the projection and support.

20. In a motor vehicle, a headlamp, a support therefor, a fastening element for securing the lamp on the support, and an ornamental post removably fitted to said element for removal therefrom without affecting the relation between the headlamp and support.

21. In a motor vehicle, a headlamp, means to fixedly mount the lamp, and an upwardly extending post engageable with said means, but removable therefrom without disturbing the headlamp mounting.

In testimony whereof I affix my signature.

ERNEST W. SEAHOLM.